Patented Dec. 29, 1953

2,664,443

UNITED STATES PATENT OFFICE 2,664,443

PROCESS OF PRODUCING TRICHLOROMETHANE SULFONYL CHLORIDE

William P. ter Horst, Lewiston, and Warren K. Cline, Niagara Falls, N. Y., assignors to Mathieson Chemical Corporation, a corporation of Virginia No Drawing. Application January 8, 1952, Serial No. 265,536

5 Claims. (Cl. 260—543)

This invention relates to a process for the manufacture of trichloromethane sulfonyl chloride from perchloromethyl mercaptan. More specifically, this invention is concerned with a method of producing trichloromethane sulfonyl chloride by the oxidation of perchloromethyl mercaptan dissolved in chloroform with a metal hypochlorite such as calcium hypochlorite.

In the past, trichloromethane sulfonyl chloride has been produced by the oxidation of perchloromethyl mercaptan with reagents including nitric acid or 30% hydrogen peroxide dissolved in acetic acid. However, these processes give a product of only about 50% of the theoretical yield which makes them economically unattractive.

Our invention provides a process for the manufacture of trichloromethane sulfonyl chloride by the oxidation of perchloromethyl mercaptan dissolved in chloroform with an alkali metal hypochlorite or alkaline earth metal hypochlorite. In this method yields of 75 to 80% of the theoretical amount of trichloromethane sulfonyl chloride are consistently obtained. In the absence of chloroform the yield of product is no better than that obtained in the oxidation of perchloromethyl mercaptan with nitric acid or hydrogen peroxide dissolved in acetic acid. At present, we cannot assign any reason to the advantageous influence of chloroform upon this oxidation reaction.

Among the alkali metal hypochlorites and alkaline earth metal hypochlorites utilized, we have found that high test calcium hypochlorite is used with advantage. Preferably, we employ this material in a form having about 70% or more of available chlorine. However, bleaching powders or hypochlorites of other alkaline earth metals or alkali metals such as sodium, potassium and lithium may be substituted for calicum hypochlorite in our process.

To improve the yields of trichloromethane sulfonyl chloride, we provide an excess of hypochlorite in the reactants. Preferably, the oxidizing agent is used in an amount of at least 10% more than that theoretically required by the equation:

$$CCl_3SCl + Ca(OCl)_2 \rightarrow CCl_3SO_2Cl + CaCl_2$$

The use of more than 100% excess of the hypochlorite offers no greater advantage to the process.

Ordinarily, the perchloromethyl mercaptan is dissolved in about 50 to 500% of its weight of chloroform, but the amount of solvent need be only sufficient to dissolve the perchloromethyl mercaptan and the trichloromethane sulfonyl chloride formed by the oxidation. The use of solvent in too great an excess merely adds to the amount to be distilled in the subsequent recovery of the product.

We have found that the high yields of product are not obtained when using the hypochlorite oxidizing agents unless the chloroform is present. When the perchloromethyl mercaptan is dissolved in chloroform and is oxidized with other agents such as nitric acid no increase in yield of trichloromethane sulfonyl chloride is obtained. Thus, the combination of chloroform with the hypochlorites appears to be necessary to give the increased yields of trichloromethane sulfonyl chloride.

One method of performing our process is by mixing chloroform with an aqueous solution of the hypochlorite, and then adding the perchloromethyl mercaptan. The mixture is stirred until the oxidation has proceeded to the desired extent and then allowed to cool. The chloroform and dissolved product separate in a layer which is washed with water and evaporated to obtain the trichloromethane sulfonyl chloride.

The following example illustrates the present invention in a specific embodiment but is not intended to limit it to the particular choice of proportions, methods or conditions described. As noted above, other hypochlorites in aqueous solution may be employed in place of the calcium hypochlorite.

Example

A solution of 320 grams of calcium hypochlorite (HTH, 70% available chlorine) in 800 ml. of water was stirred with 400 ml. of chloroform. Perchloromethyl mercaptan was added at a convenient rate to maintain the mixture at refluxing temperature due to the heat of reaction. This temperature was 63° C. After the addition of 120 grams (0.641 mole) of perchloromethyl mercaptan, the mixture was stirred for 2 hours and allowed to cool. Excess hypochlorite was decomposed by the addition of concentrated HCl. The chloroform layer was separated, washed 3 times with water and evaporated until the temperature of the residue was 75–80° C. Trichloromethylsulfonyl chloride, 108 grams, melting at 132.5–134.1, was obtained in 77.3% yield.

We claim:

1. In the manufacture of trichloromethane sulfonyl chloride, the method which comprises oxidizing perchloromethyl mercaptan dissolved in chloroform with a material selected from the group consisting of alkali metal hypochlorites and alkaline earth metal hypochlorites.

2. In the manufacture of trichloromethane sulfonyl chloride, the method which comprises oxidizing perchloromethyl mercaptan dissolved in chloroform with calcium hypochlorite.

3. In the manufacture of trichloromethane sulfonyl chloride, the method which comprises oxidizing perchloromethyl mercaptan dissolved in chloroform with sodium hypochlorite.

4. In the manufacture of trichloromethane sulfonyl chloride, the method which comprises oxidizing perchloromethyl mercaptan dissolved in chloroform with potassium hypochlorite.

5. In the manufacture of trichloromethane sulfonyl chloride, the method which comprises oxidizing perchloromethyl mercaptan dissolved in chloroform with lithium hypochlorite.

WILLIAM P. TER HORST.
WARREN K. CLINE.

References Cited in the file of this patent

UNITED STATES PATENTS

| Number | Name | Date |
|---|---|---|
| 2,123,082 | Schulze | July 5, 1938 |
| 2,573,674 | Adams et al. | Nov. 6, 1951 |

OTHER REFERENCES

Beilstein, vol. 3, page 19.